March 22, 1966 W. J. BLAIKLOCK 3,241,356
GAGE PLUG
Filed April 24, 1964
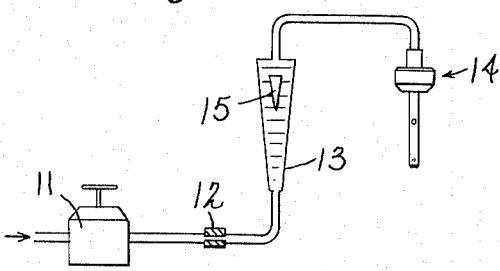
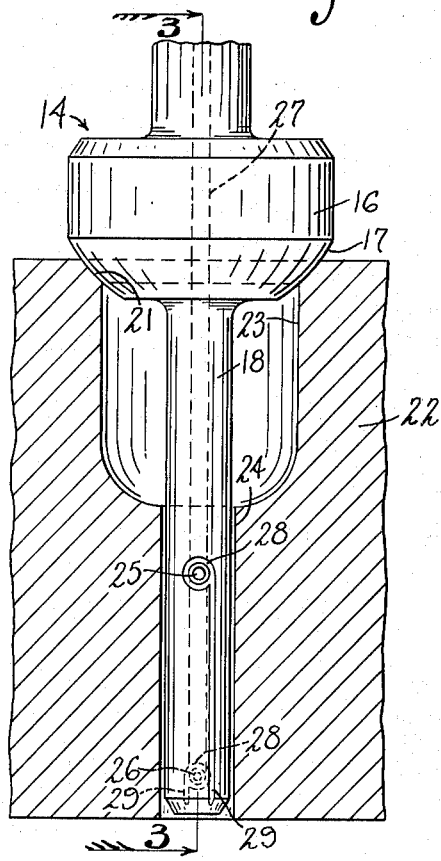
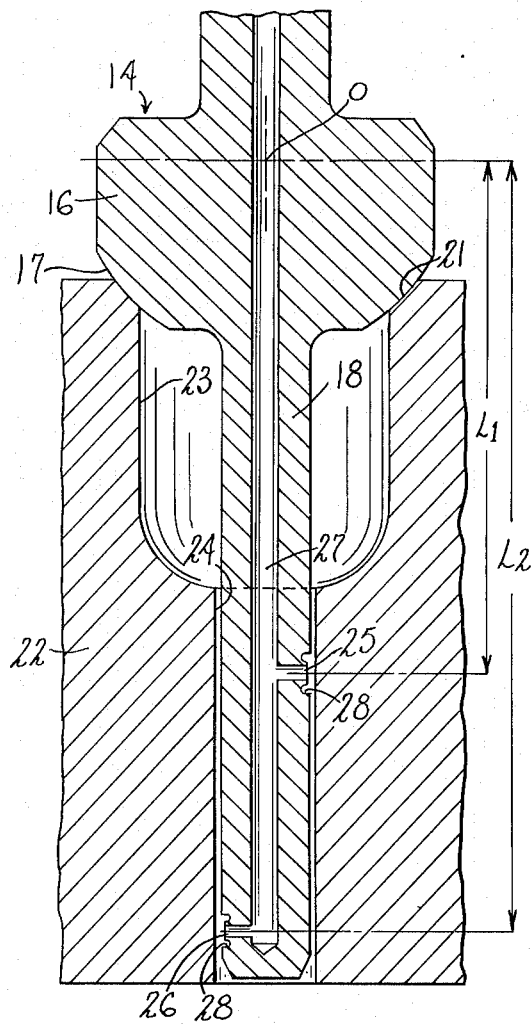
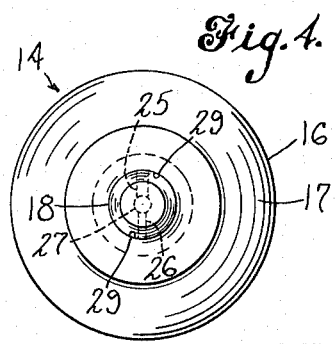
INVENTOR
William J. Blaiklock
BY
Rockwell and DeLio
ATTORNEYS

United States Patent Office 3,241,356
Patented Mar. 22, 1966

3,241,356
GAGE PLUG
William J. Blaiklock, Collinsville, Conn., assignor to Pratt & Whitney Inc., West Hartford, Conn., a corporation of Delaware
Filed Apr. 24, 1964, Ser. No. 362,285
6 Claims. (Cl. 73—37.9)

This invention relates generally to a gage plug and more specifically to a gage plug for a fluid system for measuring the concentricity between a circular bearing surface and an axially aligned bore. The gage plug is especially adapted for use in measuring concentricity between a valve seat and a guide bore of the type found in the usual internal combustion engine.

In the usual type of 4-cycle engine, a plurality of valves is provided for charging and exhausting the cylinders. The head of a valve has a beveled seat and the valve is actuated through its stem. The engine carries a mating seat concentric with a guide bore in which the stem rides and through which it extends. In internal combustion engines, dimensional tolerances are quite important and means must be provided for gaging the machined parts. Fluid gaging has become quite prevalent in many applications because of its speed and accuracy and because, in a non-contacting system, the "feel" of the operator is not as significant a factor. After a valve seat and guide bore are machined, the dimensions must be checked. Normally the guide bore is first checked for size and out-of-roundness and then the concentricity between the guide bore and the valve seat is checked. The concentricity or axial alignment is critical for proper seating of the valve. An improperly seated valve causes substantial loss in power and also promotes valve failure. Most methods presently used for checking valve seat to guide bore concentricity are costly and difficult to use.

Accordingly, the primary object of this invention is to provide an improved gage plug which permits a quick, accurate and simple means for checking the concentricity between a circular bearing surface and a bore in axial alignment therewith.

Another object of the invention is to provide an improved gage plug of the class described, which can be manually operated and which automatically overcomes the deficiencies in the skill of the operator.

Still other objects and advantages of the invention will in part be obvious and will in part be apparent from the specification.

Generally speaking, in accordance with this invention, a fluid gage plug is constructed with a spherical seat having a preselected radius of curvature. The spherical seat is adapted to physically contact the seat of the circular bearing surface being measured. Extending concentrically from the spherical seat is a shaft whose diameter is sufficiently small to enter with clearance the bore which is to be gaged. Fluid gaging nozzles are provided in the surface of the shaft interconnected to a passage through the shaft through which the gage plug communicates with the gaging system. The nozzles are at different radial distances from the center of the spherical seat and are disposed on opposite sides of the shaft. The nozzle diameters are proportional to the distances from the radial center of the plug.

The invention accordingly comprises the features of construction, combination of elements, and arrangement of parts which will be exemplified in the construction hereinafter set forth, and the scope of the invention will be indicated in the claims.

For a fuller understanding of the invention, reference is had to the following description taken in connection with the accompanying drawing, in which:

FIG. 1 is a schematic diagram of a flow gage system incorporating a gage plug constructed in accordance with the invention;

FIG. 2 is a sectional elevational view of a gage plug constructed in accordance with the invention for gaging the concentricity between a circular bearing surface and an axially aligned bore;

FIG. 3 is an enlarged sectional view taken along line 3—3 of FIG. 2; and

FIG. 4 is a bottom view of a gage plug constructed in accordance with the invention.

Referring now to the drawing, a simplified schematic diagram of a flow gage system incorporating the novel gage plug is shown in FIG. 1. Fluid, usually air, from a source (not shown) passes through a regulator 11 for control of the pressure in the system. From the regulator, the fluid passes through a restriction 12 and thence through a flow meter 13 to the gage plug indicated generally at 14. Restriction 12 serves to isolate the flow meter and the gage plug from the pressure regulator so that variations in flow through the gage plug will cause proportional variations in flow through the flow meter in order to change the height of a float 15 within the flow meter. This type of fluid gaging system is well known in the art and many additional elements may be introduced to effect magnification, sensitivity and the like. The gaging system forms no part of this invention, but is shown for environmental purposes. Furthermore, it should be noted that a back-pressure gage in parallel with the restriction and gage plug could be substituted for the flow meter in series with the restriction and gage plug if a back pressure system is preferred to a flow meter system.

Referring now to FIGS. 2 through 4, gage plug 14 includes a body 16 provided with a spherical bearing surface 17 generated from a center of curvature lying on the longitudinal axis of the gage plug and indicated by the letter O. Extending from body 16 is a cylindrical shaft 18 concentric with the body and the spherical bearing surface. In FIGS. 2 and 3, the gage plug is shown in contact with a piece to be measured which may be the valve seat and guide bore for a valve in an internal combustion engine. A circular beveled valve seat 21 is formed in the surface of member 22 which defines a certain portion of the combustion chamber. The placement of valve depends upon engine design. A bore 23 of smaller diameter than the valve seat provides a clearance passage for supplying or scavenging the combustion chamber charge and the bore communicates with a guide bore 24 which is adapted to receive and guide the stem of the valve. It is the concentricity between valve seat 21 and guide bore 24 which is to be gaged. As shown, spherical bearing surface 17 of body 16 rests on the valve seat with shaft 18 extending into guide bore 24 for a substantial distance.

Shaft 18 is provided with a pair of nozzles for the escape of fluid therefrom. A first nozzle 25 extends from the surface of shaft 18 to the center of the shaft perpendicular to the longitudinal axis of the shaft and is closest to the spherical bearing surface. The lineal distance of first nozzle 25 from the center of curvature O of the spherical bearing surface may be considered to be $L_1$ and the nozzle diameter is $D_1$. A second nozzle 26 has its central axis parallel to the central axis of the first nozzle but is spaced therefrom so that the distance $L_2$ of nozzle 26 from the center of curvature of the spherical bearing surface is greater than distance $L_1$. Nozzle 26 is disposed on the opposite side of shaft 18, 180° from nozzle 25, as best shown in FIG. 4. The diameter of the second nozzle may be considered to be $D_2$. A central passage 27 formed along the longitudinal axis of the gage plug interconnects the two nozzles and also serves to connect the gage plug to the gaging system. The diameter of central passage 27 is preferably sufficiently large to permit unrestricted passage of the volume of fluid which may escape from the two nozzles.

The external surfaces of both nozzles 25 and 26 are below the surface of shaft 18 to thereby prevent complete blockage of either nozzle should the surface of the shaft come in contact with the internal surface of the guide bore. Also, an annular undercut 28 surrounds each nozzle and communicates with a longitudinal groove 29 in the surface of the shaft to prevent obstruction of the escape passage for the fluid coming from each nozzle if portions of the external surface of the shaft comes in contact with the guide bore.

Before gaging concentricity between valve seat 21 and guide bore 24, the seat and guide bore is measured by known methods for size and out-of-roundness. Thereafter, gage plug 14, connected to an appropriate gaging system, such as that shown in FIG. 1, is manually inserted so that shaft 18 extends into the guide bore and spherical bearing surface 17 seats on the valve seat. The flow of fluid (air) escaping through the nozzles provides for flow through the system and the height of float 15 in the flow meter is proportional to the volume of air escaping through the nozzles. The clearance between the nozzles and the internal surface of the guide bore restricts the flow in the manner well known in the fluid gaging art. In accordance with the principles of this art, the flow from each nozzle is proportional to the nozzle diameter and the distance of the nozzle surface from the surface being gaged. By manually rotating the gage plug on the valve seat, the concentricity of the valve seat with relation to the guide bore can be measured. If the seat and bore are perfectly concentric, no change in flow will be registered by the float as the gage plug is rotated. However, an error in concentricity will cause a change in flow from the nozzles as the gage plug is manually rotated and the change in flow will be indicated by change in the height of float 15. By calibration of the system, each increment of movement of the float indicates a certain eccentricity between the valve seat and guide bore.

It should be noted that the gage plug system cannot readily distinguish between eccentricity and out-of-roundness. However, since out-of-roundness is measured first, these variations are deducted from the variations measured by the instant gaging system to provide eccentricity data only.

Because the shaft of the gage plug is smaller than the guide bore and because the gage plug is manually rotated, it is quite likely that the gage plug will be rocked in the guide bore during rotating by the operator. It is apparent that rocking of the gage plug causes the nozzles to move closer to or further from the walls of the guide bore. This change in clearance would change the flow from each of the nozzles, thereby causing erroneous flow meter readings. However, gage plug 14 specifically eliminates any errors in the readings caused by rocking or side shake of the gage plug in the following manner. Any rocking of the gage plug as the plug is held against the valve seat takes place only about the center of curvature O of the spherical bearing surface. For this reason, the movement of each nozzle toward or from the wall of the guide bore is proportional to its distance from center O. In other words, the change of the distance of the first nozzle from the wall of the guide bore as compared with the change of the distance of the second nozzle from the wall of the guide bore, is in the ratio of the distances $L_1/L_2$. Thus, for any given movement of the first nozzle, a greater movement of the second nozzle occurs.

As stated above, the flow through a nozzle is dependent upon its diameter and its distance from the surface being measured. In order to eliminate the effects of change in flow through the total system caused by unequal changes in flow from each nozzle, the first nozzle is of greater diameter than the second nozzle and the ratio of diameters is inversely proportional to the ratio of the distances of the nozzle from center point O. In this manner, any increase in flow through one nozzle is balanced by an equal decrease in flow through the other nozzle. As an example, a gage plug was constructed in accordance with the invention having an $L_2/L_1$ ratio of 3/2. By providing a ratio of the diameters of the nozzles $D_2/D_1$ of 2/3, the effects of rocking of the gage plug on the flow through the system were eliminated.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A fluid gage plug for measuring concentricity comprising a body having a spherical bearing surface, a shaft extending concentrically from said body, a first nozzle carried by said shaft and a second nozzle carried by said shaft spaced 180° from said first nozzle, the ratio of the distances of said nozzles from the center of curvature of said spherical bearing surface being inversely proportional to the ratio of the diameters of said nozzles.

2. A fluid gauge plug comprising a body having a bearing portion about which said gage plug rocks, a shaft extending from said body, first fluid escape means in said shaft spaced from said bearing portion, second fluid escape means in said shaft spaced from said bearing portion and said first fluid escape means, the second fluid escape means at a greater distance from the bearing portion than said first fluid escape means, the diameter of the first fluid escape means greater than the diameter of the second fluid escape means, and a central passage interconnecting said first and second fluid escape means formed along the longitudinal axis of the shaft for providing fluid to the first and second fluid escape means, the diameter of each fluid escape means being inversely proportional to the distance from the bearing portion to each of said fluid escape means.

3. A fluid gage plug for measuring concentricity between a seat and a bore comprising a body having a spherical bearing surface adapted to engage the seat, a cylindrical shaft extending concentrically from said body, the outside diameter of said shaft being less than the inside diameter of the bore to be measured, a first nozzle carried by said shaft, a second nozzle carried by said shaft, said first and second nozzles being spaced from one another along the longitudinal axis of said shaft and being spaced 180° from one another along transverse axes, the ratio of the distances of said first and second nozzles from the center of curvature of said spherical bearing surface being inversely proportional to the ratio of the diameters of said first and second nozzles, and a passage in said shaft for supplying fluid to said nozzles and for connecting said gage plug to a fluid gaging system.

4. A gage plug as in claim 3, wherein the outermost edges of said first and second nozzles are below the surface of said cylindrical shaft and wherein said gage plug further includes an annular undercut in said shaft surrounding each of said nozzles and a groove in the surface of said shaft communicating between each of said annular undercuts and the free end of said shaft.

5. A gage plug as in claim 3, and further including an annular undercut in said shaft surrounding each of said nozzles and a groove in the surface of said shaft communicating between each of said annular undercuts and the free end of said shaft.

6. A fluid gage plug for measuring concentricity comprising a body having a spherical bearing surface, a shaft extending concentrically from said body, a first nozzle carried by said shaft and a second nozzle carried by said shaft and spaced angularly and actually from said first nozzle, the ratio of the distances of said nozzle from the center of curvature of said spherical bearing surface being inversely proportional to the ratio of the diameters of the nozzles.

References Cited by the Examiner

UNITED STATES PATENTS

| | | | |
|---|---|---|---|
| 2,486,052 | 10/1949 | Moore | 73—37.9 |
| 2,751,778 | 6/1956 | Mennesson | 73—37.9 |
| 2,775,117 | 12/1956 | Aller | 73—37.9 |
| 2,826,909 | 3/1958 | Schmidt | 73—37.9 |
| 2,831,263 | 4/1958 | Mahlmeister. | |

LOUIS R. PRINCE, *Primary Examiner.*

F. H. THOMSON, *Assistant Examiner.*